(12) United States Patent
Son et al.

(10) Patent No.: US 12,002,300 B2
(45) Date of Patent: *Jun. 4, 2024

(54) METHOD AND SYSTEM FOR UTILIZING VEHICLE ODOMETER VALUES AND DYNAMIC COMPLIANCE

(71) Applicant: Platform Science, Inc., San Diego, CA (US)

(72) Inventors: Don Son, San Diego, CA (US); Scott Kopchinsky, San Diego, CA (US); John C. Kennedy, San Diego, CA (US); Jacob Fields, San Diego, CA (US); Nathan Condell, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/878,002

(22) Filed: Jul. 31, 2022

(65) Prior Publication Data

US 2022/0366732 A1 Nov. 17, 2022

Related U.S. Application Data

(60) Continuation of application No. 17/165,921, filed on Feb. 2, 2021, now Pat. No. 11,430,270, which is a
(Continued)

(51) Int. Cl.
*G07C 5/00* (2006.01)
*G01C 22/02* (2006.01)
(Continued)

(52) U.S. Cl.
CPC ........... *G07C 5/008* (2013.01); *G01C 22/025* (2013.01); *G07C 5/085* (2013.01); *G08G 1/20* (2013.01); *H04W 4/40* (2018.02)

(58) Field of Classification Search
CPC ..... H04W 76/10; H04W 76/19; H04W 8/005; H04L 29/08; H04L 67/12
See application file for complete search history.

(56) References Cited

U.S. PATENT DOCUMENTS 5,579,233 A 11/1996 Burns
5,954,773 A 9/1999 Luper
(Continued)

FOREIGN PATENT DOCUMENTS

CN 108462673 A 8/2018
CN 109714420 A 5/2019
(Continued)

OTHER PUBLICATIONS

International Search Report for PCT Application PCT/US2017/037825, mailed on Sep. 21, 2017.
(Continued)

*Primary Examiner* — Kyaw Z Soe
(74) *Attorney, Agent, or Firm* — Clause Eight; Michael Catania

(57) ABSTRACT

A system and method vehicle dynamic compliance and utilizing multiple vehicle odometer values is disclosed herein. The system comprises a vehicle (210) comprising an on-board computer (232) with a memory (231) having a vehicle identification number (233), a connector plug (235), and an motorized engine (234), a connected vehicle device (130) comprising a processor, a WiFi radio, a BLUETOOTH radio, a memory, and a connector for mating with the connector plug of the vehicle (210), and a mobile device (110) comprising a graphical user interface (335), a processor (310), a WiFi radio (307), a BLUETOOTH radio (306), and a cellular network interface (308).

16 Claims, 10 Drawing Sheets

Related U.S. Application Data continuation of application No. 16/547,540, filed on Aug. 21, 2019, now Pat. No. 10,930,091, which is a division of application No. 15/859,380, filed on Dec. 30, 2017, now Pat. No. 10,475,258, which is a continuation-in-part of application No. 15/624,814, filed on Jun. 16, 2017, now Pat. No. 9,961,710.

(60) Provisional application No. 62/441,290, filed on Dec. 31, 2016, provisional application No. 62/441,298, filed on Dec. 31, 2016, provisional application No. 62/441,315, filed on Dec. 31, 2016, provisional application No. 62/352,014, filed on Jun. 19, 2016.

(51) Int. Cl.
*G07C 5/08* (2006.01)
*G08G 1/00* (2006.01)
*H04W 4/40* (2018.01)

(56) References Cited

U.S. PATENT DOCUMENTS

| | | | |
|---|---|---|---|
| 5,995,898 A | 11/1999 | Tuttle | |
| 6,292,724 B1 | 9/2001 | Apsell et al. | |
| 6,526,341 B1 | 2/2003 | Bird et al. | |
| 6,611,686 B1 | 8/2003 | Smith et al. | |
| 6,651,001 B2 | 11/2003 | Apsell | |
| 6,735,150 B2 | 5/2004 | Rothman | |
| 6,925,308 B2 | 8/2005 | Goldsmith et al. | |
| 7,043,365 B2 | 5/2006 | Inbar et al. | |
| 7,079,230 B1 | 7/2006 | McInerney et al. | |
| 7,092,803 B2 | 8/2006 | Kapolka et al. | |
| 7,327,250 B2 | 2/2008 | Harvey | |
| 7,350,707 B2 | 4/2008 | Barkan | |
| 7,555,378 B2 | 6/2009 | Larschan et al. | |
| 7,616,105 B2 | 11/2009 | Macielinski et al. | |
| 7,725,216 B2 | 5/2010 | Kim | |
| 8,626,144 B2 | 1/2014 | Talty et al. | |
| 8,626,568 B2 | 1/2014 | Warkentin et al. | |
| 8,789,161 B2 | 7/2014 | Jeal | |
| 8,855,626 B2 | 10/2014 | O'Toole et al. | |
| 9,032,493 B2 | 5/2015 | Lortz et al. | |
| 9,064,422 B2 | 6/2015 | Mohn et al. | |
| 9,147,335 B2 | 9/2015 | Raghunathan et al. | |
| 9,215,590 B2 | 12/2015 | Bondesen et al. | |
| 9,256,992 B2 | 2/2016 | Davidson | |
| 9,262,934 B2 | 2/2016 | Mohn et al. | |
| 9,275,010 B2 | 3/2016 | Kote et al. | |
| 9,376,090 B2 * | 6/2016 | Gennermann | B60R 25/04 |
| 9,390,628 B2 | 7/2016 | Mohn et al. | |
| 9,424,751 B2 | 8/2016 | Hodges et al. | |
| 9,445,447 B2 | 9/2016 | Pal et al. | |
| 9,544,768 B2 | 1/2017 | Steffey et al. | |
| 9,578,668 B2 | 2/2017 | Sim | |
| 9,632,506 B2 | 4/2017 | Wellman et al. | |
| 9,595,018 B2 | 6/2017 | Tang | |
| 9,671,241 B2 | 6/2017 | Tang | |
| 9,754,425 B1 | 9/2017 | Iqbal et al. | |
| 9,961,710 B2 | 5/2018 | Son et al. | |
| 10,070,471 B2 | 9/2018 | Son et al. | |
| 10,074,220 B2 | 9/2018 | Cawse et al. | |
| 10,255,575 B2 | 4/2019 | Warkentin et al. | |
| 10,255,606 B2 | 4/2019 | Harter et al. | |
| 10,334,638 B2 | 6/2019 | Son et al. | |
| 10,475,258 B1 | 11/2019 | Son et al. | |
| 10,652,935 B1 | 5/2020 | Son et al. | |
| 10,803,682 B1 | 10/2020 | Son et al. | |
| 10,829,063 B1 | 11/2020 | Konrardy et al. | |
| 10,917,921 B2 | 2/2021 | Kennedy et al. | |
| 10,930,091 B1 | 2/2021 | Son et al. | |
| 11,197,329 B2 | 12/2021 | Kennedy et al. | |
| 11,197,330 B2 | 12/2021 | Kennedy et al. | |
| 11,330,644 B2 | 5/2022 | Kopchinsky et al. | |
| 11,419,163 B2 | 8/2022 | Kennedy et al. | |
| 11,430,270 B1 | 8/2022 | Son et al. | |
| 11,438,938 B1 | 9/2022 | Kennedy et al. | |
| 11,503,655 B2 | 11/2022 | Kennedy et al. | |
| 11,528,759 B1 | 12/2022 | Kennedy et al. | |
| 2008/0039983 A1 | 2/2008 | Oesterling et al. | |
| 2008/0137860 A1 | 6/2008 | Silvernail | |
| 2009/0099724 A1 | 4/2009 | Kranz et al. | |
| 2009/0276115 A1 | 11/2009 | Chen | |
| 2010/0279733 A1 | 11/2010 | Karsten et al. | |
| 2011/0080256 A1 | 4/2011 | Mehalshick, Sr. | |
| 2012/0030467 A1 | 2/2012 | Schaefer | |
| 2012/0161927 A1 | 6/2012 | Pierfelice et al. | |
| 2012/0254960 A1 | 10/2012 | Lortz et al. | |
| 2012/0262283 A1 | 10/2012 | Biondo et al. | |
| 2012/0323690 A1 | 12/2012 | Michael | |
| 2013/0006715 A1 | 1/2013 | Warkentin et al. | |
| 2013/0017816 A1 | 1/2013 | Talty et al. | |
| 2013/0046846 A1 | 2/2013 | Mason et al. | |
| 2013/0110296 A1 | 5/2013 | Khoo et al. | |
| 2013/0304276 A1 | 11/2013 | Flies | |
| 2014/0122187 A1 | 5/2014 | Warkentin et al. | |
| 2014/0162598 A1 | 6/2014 | Villa-Real | |
| 2014/0213176 A1 * | 7/2014 | Mendelson | G08C 17/02 455/39 |
| 2014/0223235 A1 | 8/2014 | Gundlapalli et al. | |
| 2014/0232569 A1 | 8/2014 | Skinder et al. | |
| 2014/0309891 A1 | 10/2014 | Ricci | |
| 2014/0309892 A1 | 10/2014 | Ricci | |
| 2015/0099500 A1 * | 4/2015 | Chalmers | H04W 4/027 455/418 |
| 2015/0120135 A1 * | 4/2015 | Lawrenson | B60R 16/037 701/36 |
| 2015/0147974 A1 | 5/2015 | Tucker et al. | |
| 2015/0191152 A1 * | 7/2015 | Gennermann | B60R 25/25 180/287 |
| 2015/0215986 A1 * | 7/2015 | Lei | H04W 76/19 370/329 |
| 2015/0339334 A1 * | 11/2015 | Hanke | H04L 67/10 707/736 |
| 2015/0365979 A1 | 12/2015 | Park | |
| 2016/0009304 A1 | 1/2016 | Kumar et al. | |
| 2016/0011001 A1 | 1/2016 | Emory et al. | |
| 2016/0066127 A1 * | 3/2016 | Choi | H04W 4/80 455/41.2 |
| 2016/0084657 A1 | 3/2016 | Schilling et al. | |
| 2016/0150588 A1 * | 5/2016 | Yae | H04W 12/06 455/41.2 |
| 2016/0247153 A1 | 8/2016 | Leseky | |
| 2016/0277923 A1 * | 9/2016 | Steffey | H04W 12/04 |
| 2016/0334236 A1 | 11/2016 | Mason et al. | |
| 2016/0343255 A1 | 11/2016 | Warren | |
| 2017/0011561 A1 * | 1/2017 | Makke | B60T 17/221 |
| 2017/0017927 A1 | 1/2017 | Domnick et al. | |
| 2017/0104728 A1 * | 4/2017 | Girard | H04W 12/084 |
| 2017/0178035 A1 * | 6/2017 | Grimm | H04L 67/12 |
| 2017/0367142 A1 | 12/2017 | Son et al. | |
| 2018/0018664 A1 | 1/2018 | Purves et al. | |
| 2018/0285832 A1 | 10/2018 | Oz et al. | |
| 2018/0376522 A1 | 12/2018 | Son et al. | |
| 2019/0066041 A1 | 2/2019 | Hance et al. | |
| 2019/0156096 A1 | 5/2019 | Lin et al. | |
| 2019/0179029 A1 | 6/2019 | Pacala et al. | |
| 2019/0255963 A1 | 8/2019 | Goei | |
| 2019/0256096 A1 | 8/2019 | Graf et al. | |
| 2019/0371093 A1 | 12/2019 | Edren et al. | |
| 2020/0125870 A1 | 4/2020 | Nishimura et al. | |
| 2020/0184808 A1 | 6/2020 | Ewert | |
| 2020/0211376 A1 | 7/2020 | Roka | |
| 2020/0280827 A1 | 9/2020 | Fechtal et al. | |
| 2020/0281030 A1 | 9/2020 | Kopchinsky et al. | |
| 2020/0287775 A1 | 9/2020 | Khasis | |
| 2020/0294401 A1 | 9/2020 | Kerecsen | |
| 2020/0329512 A1 | 10/2020 | Kennedy et al. | |

(56) References Cited

U.S. PATENT DOCUMENTS

2020/0344824 A1    10/2020    Kennedy et al.
2021/0042708 A1    2/2021    Gardiner et al.

FOREIGN PATENT DOCUMENTS

| CN | 110176153 | 8/2019 |
|---|---|---|
| GB | 2449476 | 11/2008 |
| KR | 20130041660 | 4/2013 |
| WO | WO9637079 | 11/1996 |
| WO | WO2012058022 | 5/2012 |
| WO | WO2016/012064 | 1/2016 |
| WO | WO2016184011 | 11/2016 |
| WO | WO2021055384 | 3/2021 |
| WO | WO2022026344 | 2/2022 |
| WO | WO2022072287 | 4/2022 |
| WO | WO2022081494 | 4/2022 |
| WO | WO2022109298 | 5/2022 |

OTHER PUBLICATIONS

European Search Report for EP Application 17815967.9 dated Dec. 4, 2019.
Office Action for U.S. Appl. No. 15/624,814, dated Aug. 22, 2017.
International Search Report and Written Opinion for PCT Application PCT/US2020/032389, mailed on Jul. 2, 2020.
International Search Report and Written Opinion for PCT Application PCT/US2020/027032, mailed on May 28, 2020.
International Search Report and Written Opinion for PCT Application PCT/US2020/039639, mailed on Sep. 28, 2020.
International Search Report for PCT Application PCT/US2021/052247, mailed on Jan. 13, 2022.
International Search Report for PCT Application PCT/US2020/041788, mailed on Oct. 22, 2020.
Intl Search Report PCT/US2021/054449, mailed on Dec. 23, 2021.
Written Opinion PCT/US2021/054449, Nov. 19, 2021.
Written Opinion and Search Report PCT/US2021/060137, Feb. 11, 2021.
Written Opinion and Search Report PCT/US2022/024296, Jul. 22, 2022.
Written Opinion PCT/US2022/020822, Jun. 11, 2022.
Siegel et al., A Survey of the connected vehicle landscape—Architectures, enabling technologies, applications and development areas, IEEE Transactions on Intelligent Transportation Systems 19.8 (2017): 2391-2406, Oct. 4, 2017.
International Search Report and Written Opinion for PCT Application PCT/US2022/033096, mailed on Sep. 6, 2022.
International Search Report and Written Opinion for PCT Application PCT/US2021/043096, mailed on Nov. 3, 2021.
Written Opinion for PCT Application PCT/US2021/052247, mailed on Jan. 13, 2022.
International Search Report for PCT Application PCT/US2020/050940 mailed on Dec. 3, 2020.
International Search Report for PCT Application PCT/US2023/32119, mailed on Nov. 21, 2023.
European Search Report for European patent application 20841078.7, mailed on Jul. 13, 2023.
European Search Report for European patent application 20808859.1, mailed on Apr. 28, 2023.
European Search Report for European patent application 20830628.2, mailed on May 23, 2023.
European Search Report for European patent application 20831321.3, mailed on Jun. 29, 2023.
PCT Application PCT/US2023/18893 Written Opinion mailed Jul. 21, 2023.
PCT Application PCT/US2023/18893 Intl Search Report mailed Jul. 21, 2023.

* cited by examiner

METHOD AND SYSTEM FOR UTILIZING VEHICLE ODOMETER VALUES AND DYNAMIC COMPLIANCE

CROSS REFERENCES TO RELATED APPLICATIONS

The Present Application is a continuation application of U.S. patent application Ser. No. 17/165,921, filed on Feb. 2, 2021, which is a continuation application of U.S. patent application Ser. No. 16/547,540, filed on Aug. 21, 2019, now U.S. Pat. Ser. No. 10/930,091, issued on Feb. 23, 2021, which is a divisional application of U.S. patent application Ser. No. 15/859,380, filed on Dec. 30, 2017, now U.S. Pat. Ser. No. 10/475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to wireless networks for vehicles.

Description of the Related Art

The prior art discusses various techniques for wireless networks for vehicles.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device.

The Probe Response is sent in response to a Probe Request.

Processor generally includes all types of processors including without limitation microprocessors, general purpose processors, gate arrays, array processors, application specific integrated circuits (ASICs) and digital signal processors.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for securely connecting multiple devices to a single access point in a vehicle, while preventing malicious users from detecting and connecting to a wireless network published on a vehicle.

BRIEF SUMMARY OF THE INVENTION

The present invention provides a system and method of securely and accurately connecting mobile devices to wireless networks in vehicles by using encrypted wireless network configurations based on vehicle specific data.

One aspect of the present invention is a system for utilizing multiple vehicle odometer values. The system comprises a vehicle, a CVD, a mobile device, a server and a plurality of databases. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. The connected vehicle device (CVD) comprises a processor, a WiFi radio, a BLUETOOTH radio, a memory, and a connector for mating with the connector plug of the vehicle. The mobile device comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD generates a delta value for odometer value relative to a control odometer value. The CVD monitors the odometer value from each of the odometer component from an engine source, the odometer component from a dashboard source, the odometer component from a chassis source, and the odometer component from a transmission source. The CVD generates a new odometer value for one of the odometer component from an engine source, the odometer component from a dashboard source, the odometer component from a chassis source, and the odometer component from a transmission source, and the CVD modifies the odometer value by the delta value to generate the new odometer value.

Another aspect of the present invention is a method for utilizing multiple vehicle odometer values. The method comprises generating an odometer value from an odometer component from an engine source of a vehicle. The method also comprises generating an odometer value from an odometer component from a dashboard source of the vehicle. The method also comprises generating an odometer value from an odometer component from a chassis source of the vehicle. The method also comprises generating an odometer value from an odometer component from a transmission source of the vehicle. The method also comprises generating a delta value for an odometer value relative to a control odometer value at a CVD, the CVD comprising a processor, a WiFi radio, a BLUETOOTH radio, a memory, and a connector for mating with the connector plug of the vehicle. The method also comprises monitoring at the CVD the odometer value from each of the odometer component from an engine source, the odometer component from a dashboard source, the odometer component from a chassis source, and the odometer component from a transmission source. The method also comprises generating a new odometer value for one of the odometer component from an engine source, the odometer component from a dashboard source, the odometer component from a chassis source, and the odometer component from a transmission source, and modifying the odometer value by the delta value to generate the new odometer value. The method also comprises transmitting to the new odometer value to a server using a mobile device wirelessly connected to the CVD.

Yet another aspect of the present invention is a secure system for device authentication and configurations. The system comprises a vehicle, a CVD, a mobile device, a server and a plurality of databases. The vehicle comprises an on-board computer with a memory having a vehicle identification number (VIN), a connector plug, and an motorized engine. The connected vehicle device (CVD) comprises a processor, a WiFi radio, a BLUETOOTH radio, a memory, and a connector for mating with the connector plug of the vehicle. The mobile device comprises a graphical user interface, a processor, a WiFi radio, a BLUETOOTH radio, and a cellular network interface.

Yet another aspect of the present invention is a system for vehicle dynamic compliance with multiple vehicle statutes and regulations. The system comprises a vehicle, a CVD, a mobile device, a server and a plurality of databases. The vehicle comprises an on-board computer with a memory having a vehicle identification number (VIN), a connector plug, and an motorized engine. The CVD comprises a processor, a WiFi radio, a BLUETOOTH radio, a memory, and a connector for mating with the connector plug of the vehicle. The mobile device comprises a graphical user interface, a processor, a WiFi radio, a BLUETOOTH radio, and a cellular network interface. A location of the vehicle is determined using a GPS component of the vehicle. The location of the vehicle is transmitted to the server by the CVD. The server retrieves real-time compliance rules for the location of the vehicle from the plurality of databases. The server transmits the real-time compliance rules to CVD for display on the mobile device.

Yet another aspect of the present invention is a method for vehicle dynamic compliance with multiple vehicle statutes and regulations. The method comprises determining a geographical location of a vehicle using a GPS component of the vehicle. The method also includes transmitting the geographical location of the vehicle from a CVD to a server. The method also includes retrieving real-time compliance rules for the location of the vehicle at the server from a plurality of databases. The method also includes transmitting the real-time compliance rules from the server to a mobile device for display on the mobile device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
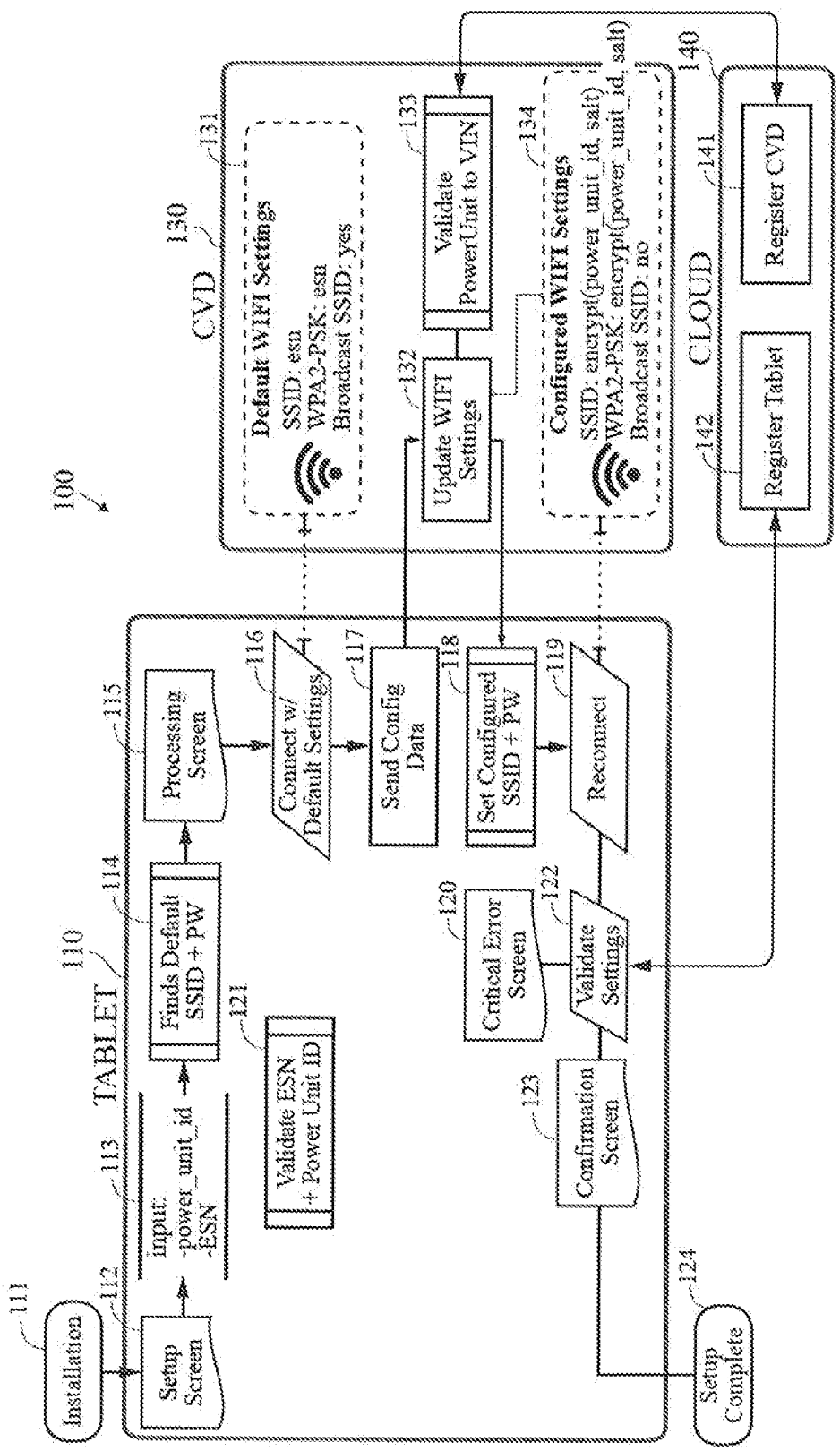
FIG. 1 is a block diagram of system for securely connecting a wireless device to a single access point in a vehicle.
Figure 2:
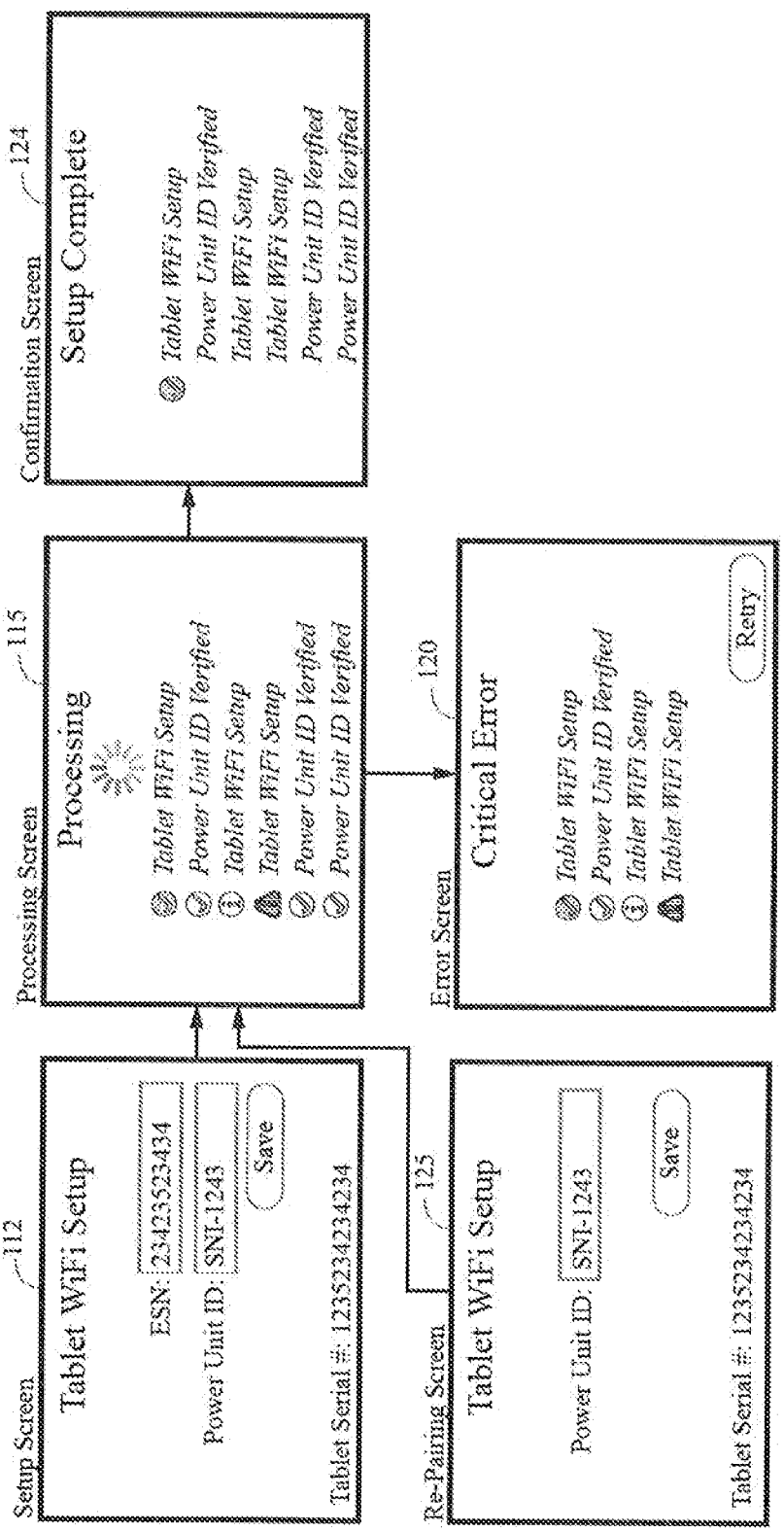
FIG. 2 is a block diagram of system for securely connecting a wireless device to a single access point in a vehicle.

FIGS. 1 and 2 illustrate a pairing process for a system 100 for securely connecting a wireless device to a single access point in a vehicle. The secure connection is preferably established between a tablet computer 110 and connected vehicle device ("CVD") 130. The CVD 130 is preferably physically connected to an on-board computer of a vehicle. The vehicle is preferably a delivery truck or a long-haul semi-truck. The CVD 130 does not broadcast a SSID, and thus the wireless network is unpublished. The tablet computer 110, having previously paired with the CVD 130, is used to "find" or re-pair with the wireless network of the CVD 130 since WiFi settings are retained in a memory of the tablet computer 130. At block 111, the installation begins for the tablet computer 110. At block 112, a setup screen having an ESN, a power unit identification and a tablet computer serial number is displayed. At block 113, the identifications are inputted, and at block 121 they are validated. At block 114, it finds the default SSID plus the password. At block 115, the processing occurs including the processing of the tablet computer setup and the verification of the power unit identification. At block 116, it connects with the default settings to the CVD 130 pairing with the default settings 131 of the CVD 130. At block 117, the tablet computer sends configuration data to the CVD 130. At block 132, the CVD 130 updates the WiFi settings and at block 133 validates the power unit to the VIN. At block 140, the CVD 130 is registered with a cloud computing service 140, and at block 142, the tablet computer is registered with the cloud computing service 140. At block 118, the tablet computer 110 sets the configured SSID and password from the CVD 130. At block 119, the tablet computer 110 reconnects with the configured WiFi settings. At block 134 on the CVD 130, the configured WiFi settings include the SSID, encrypted, the WPA2 PSK: encrypt (power unit identification salt) and the SSID is not broadcasted. At block 122, the settings are validated on the tablet computer 110. Block 120 is a critical error screen in which the tablet WIFI setup failed or the power unit identification was not verified. At block 123, a confirmation screen is shown on the tablet computer 110. At block 124, the setup is complete.

Figure 3:
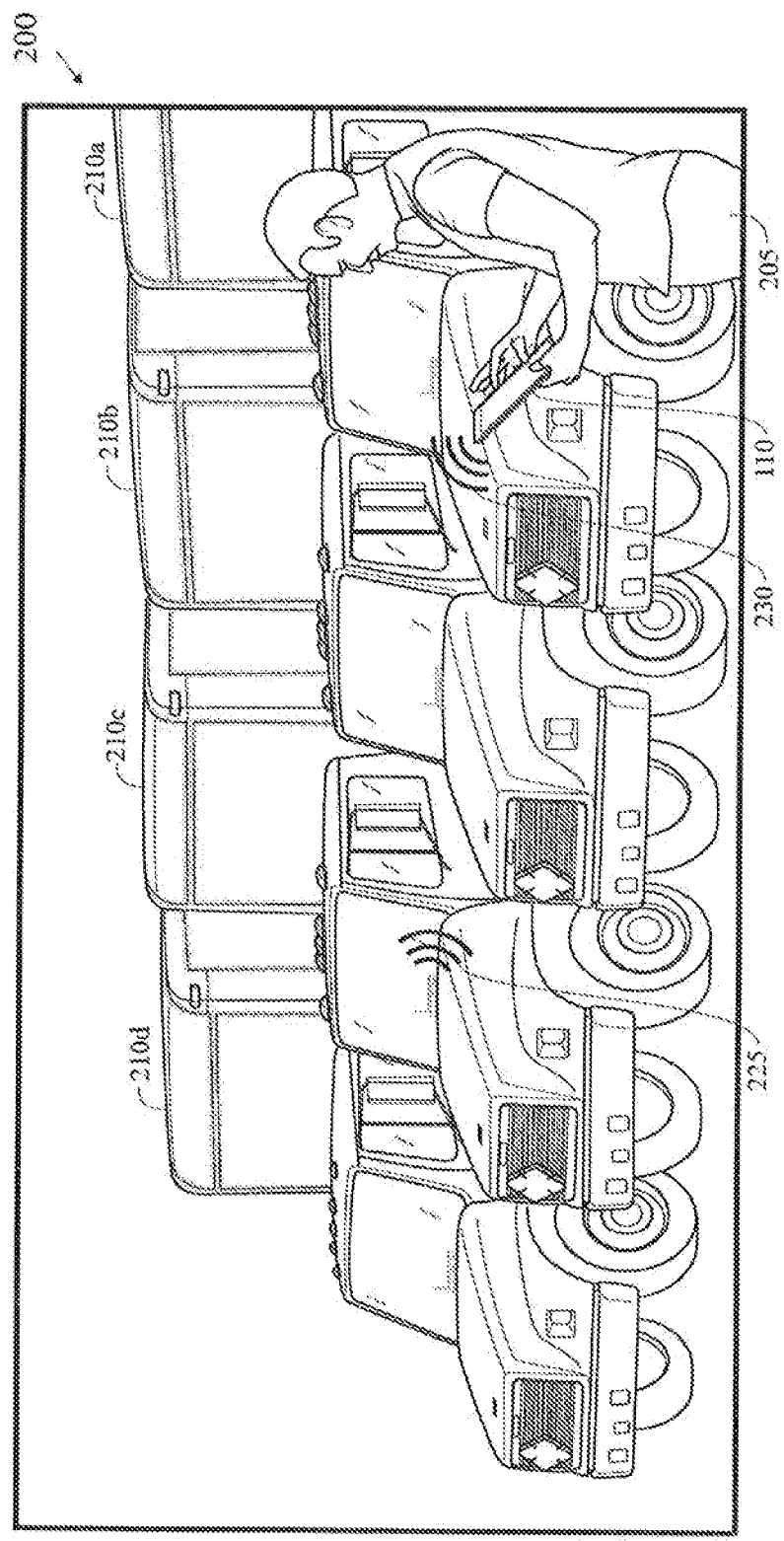
FIG. 3 is an illustration of a driver identifying a vehicle through connection of a tablet computer to an unpublished network.

As shown in FIG. 3, each of a multitude of trucks 210a-210d broadcast a wireless signal 224a-d for a truck specific network, with one truck 210c broadcasting a wireless signal 225. However, the SSID is not published so unless a driver is already in possession of the SSID, the driver will not be able to pair the tablet computer 110 with the CVD 130 of the truck 210 to which the driver is assigned. So even though the wireless signals 224a-d are being "broadcast", they will not appear on a driver's tablet computer 110 (or other mobile device) unless the tablet computer 110 has already been paired with the CVD 130 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18,19,20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats. Near-field communications (NFC) may also be utilized.

Figure 4:
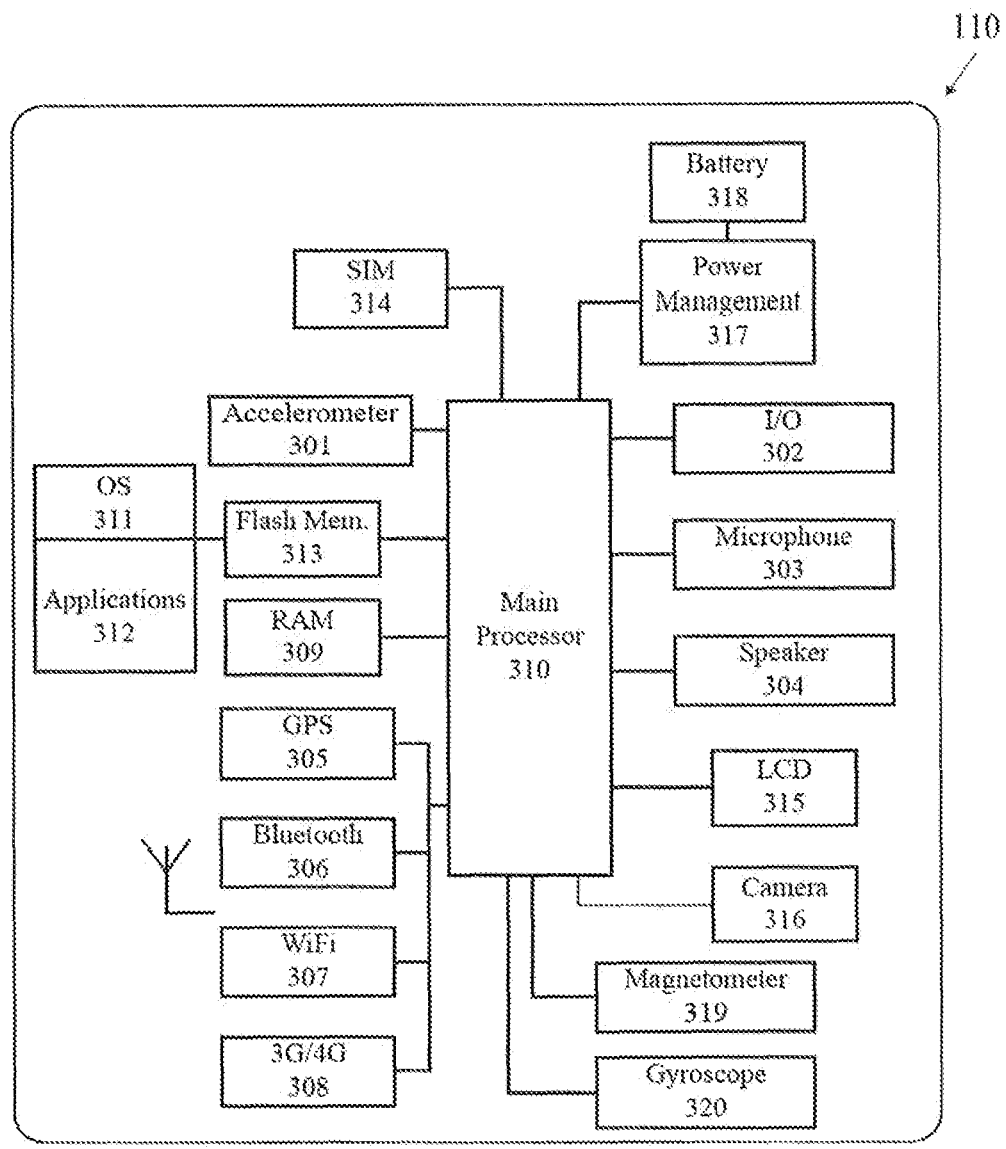
FIG. 4 is an isolated view of general electrical components of a mobile communication device.

As shown in FIG. 4, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MIMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at the cloud server 140, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
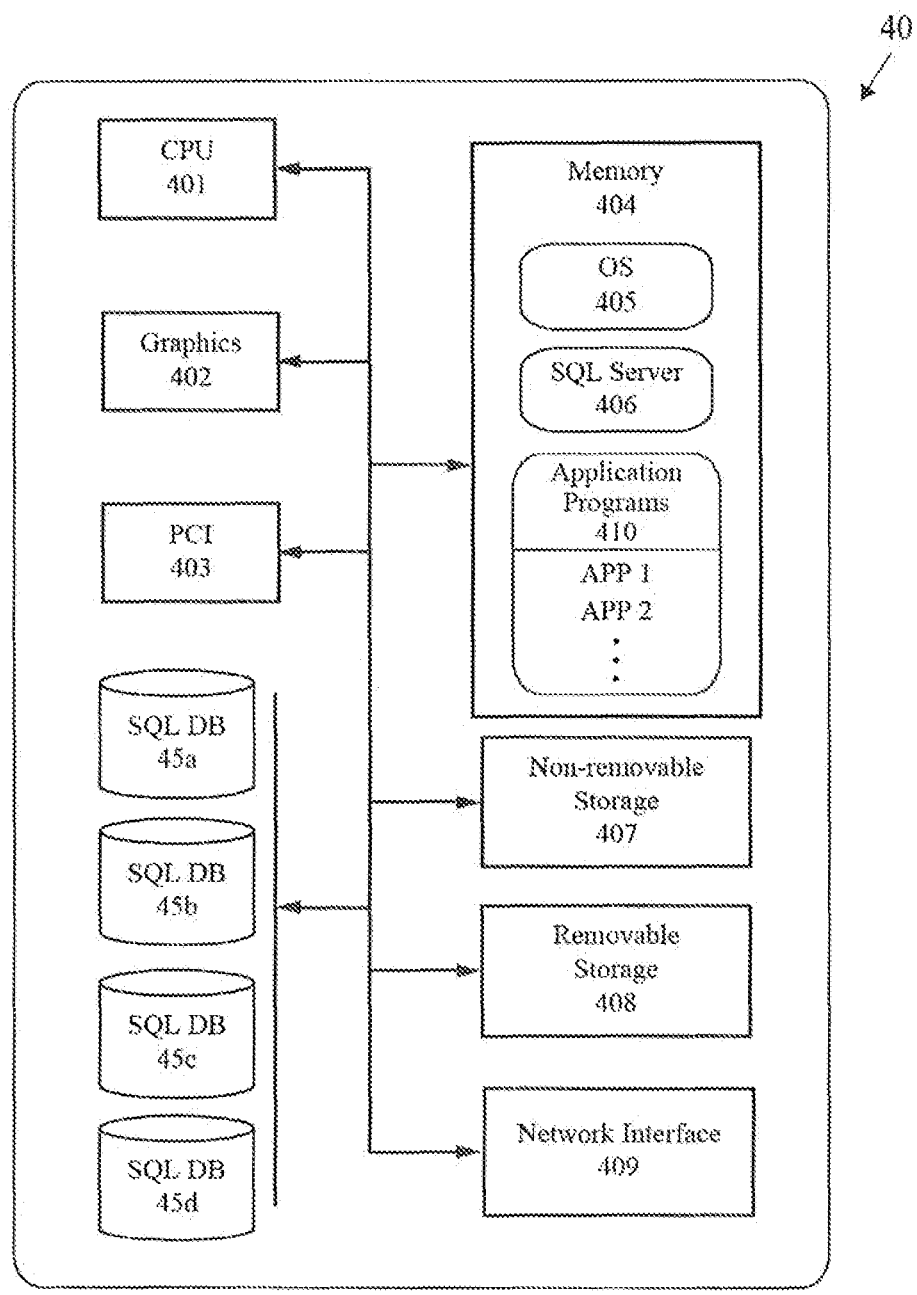
FIG. 5 is an isolated view of general electrical components of a server.

Components of a cloud computing server 140 of the system 100, as shown in FIG. 5, preferably includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The venue server 40 also includes at least one computer program configured to receive data uploads and store the data uploads in the SQL database. Alternatively, the SQL server can be installed in a separate server from the venue server 40.

Figure 6:
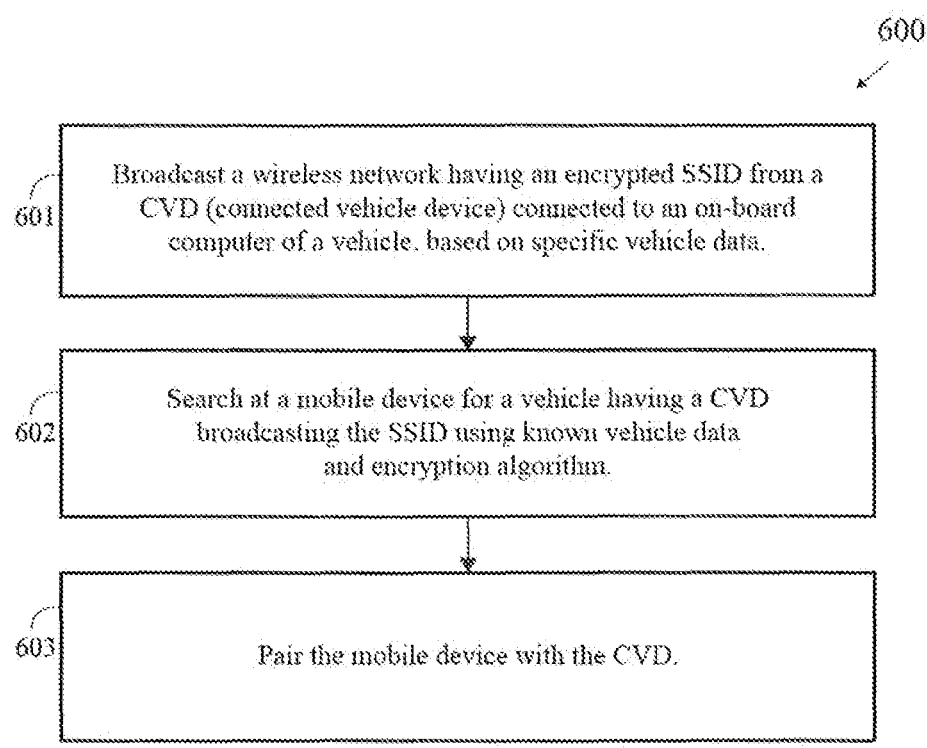
FIG. 6 is a flow chart of method for securely connecting a wireless device to a single access point in a vehicle.

A flow chart for a method 600 for a secure connection to a wireless network of a vehicle is shown in FIG. 6. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is paired with the CVD.

Figure 7:
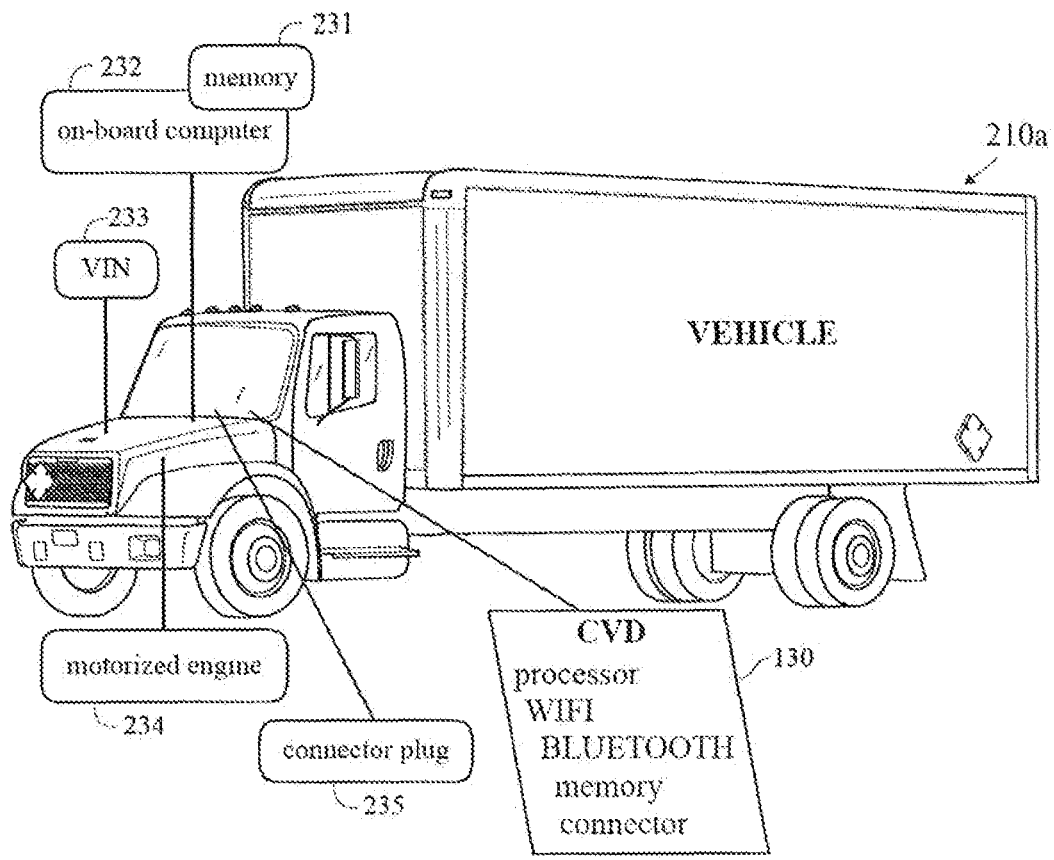
FIG. 7 is an illustration of a system for securely connecting a wireless device to a single access point in a vehicle.
Figure 7:
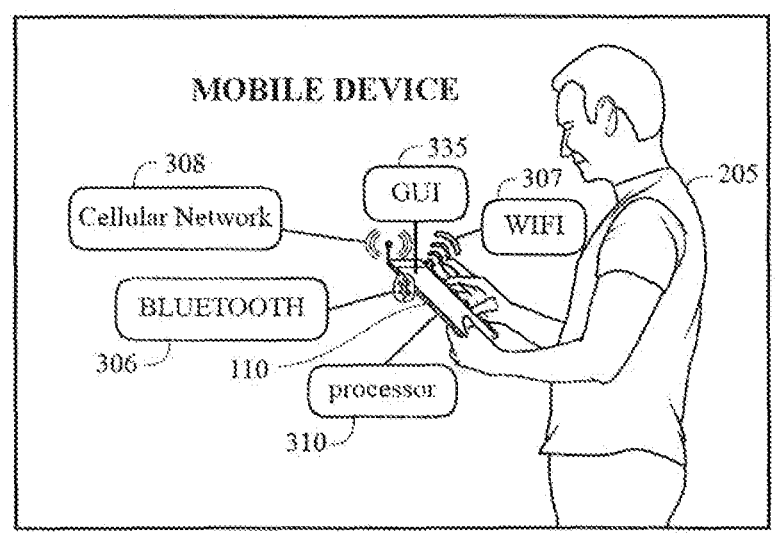

A system for a secure connection to a wireless network of a vehicle is shown in FIG. 7. A truck 210a. Those skilled in the pertinent art will recognize that the truck 210a may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 210a preferably comprises a motorized engine 234, a vehicle identification number ("VIN"), an on-board computer 232 with a memory 231 and a connector plug 235. The on-board computer 232 preferably has a digital copy of the VIN in the memory 231. The on-board computer 232 is preferably in communication with the motorized engine 234.

The truck 210a may also have a GPS component for location and navigation purposes, a satellite radio such as SIRIUS satellite radio, a driver graphical interface display, a battery, a source of fuel and other components found in a conventional long distance truck.

Also in the truck 210a is a CVD 130 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 130 of the truck 210a. The tablet computer 110 preferably comprises a graphical user interface 335, a processor 310, a WiFi radio 307, a BLUETOOTH radio 306, and a cellular network interface 308.

Figure 8:
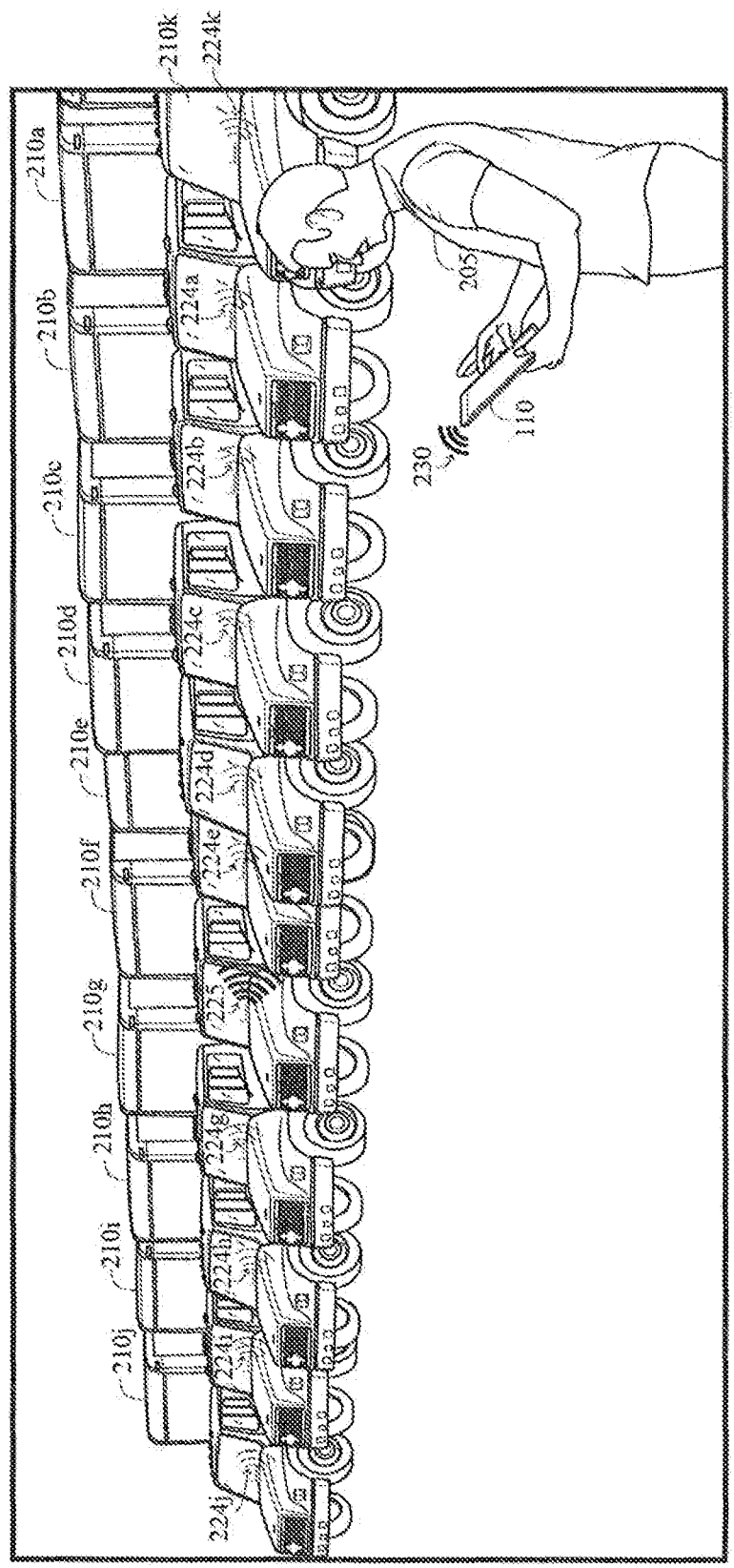
FIG. 8 is an illustration of a driver identifying a vehicle through connection of a tablet computer to an unpublished network.
Figure 9:
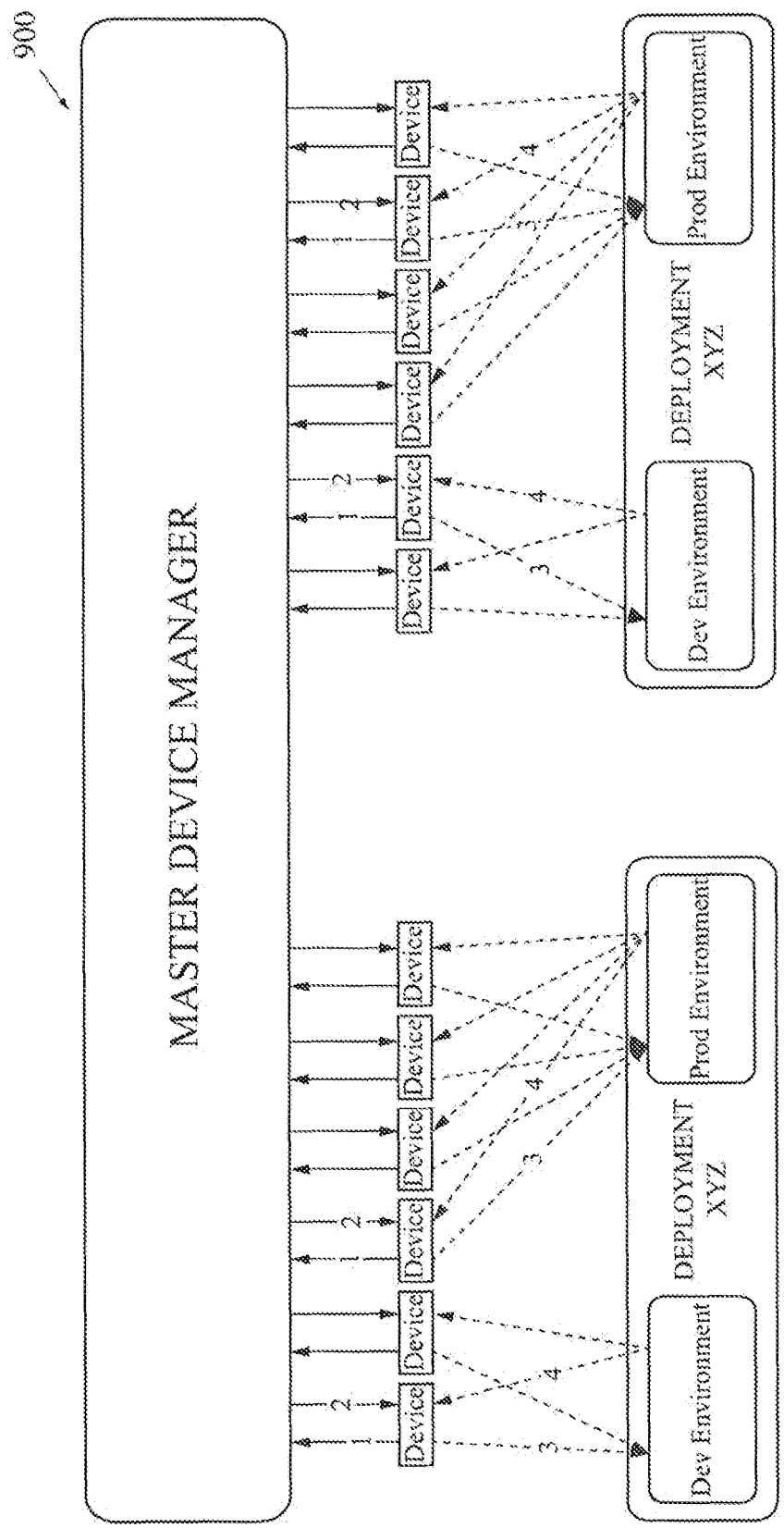
FIG. 9 is a flow diagram.
Figure 10:
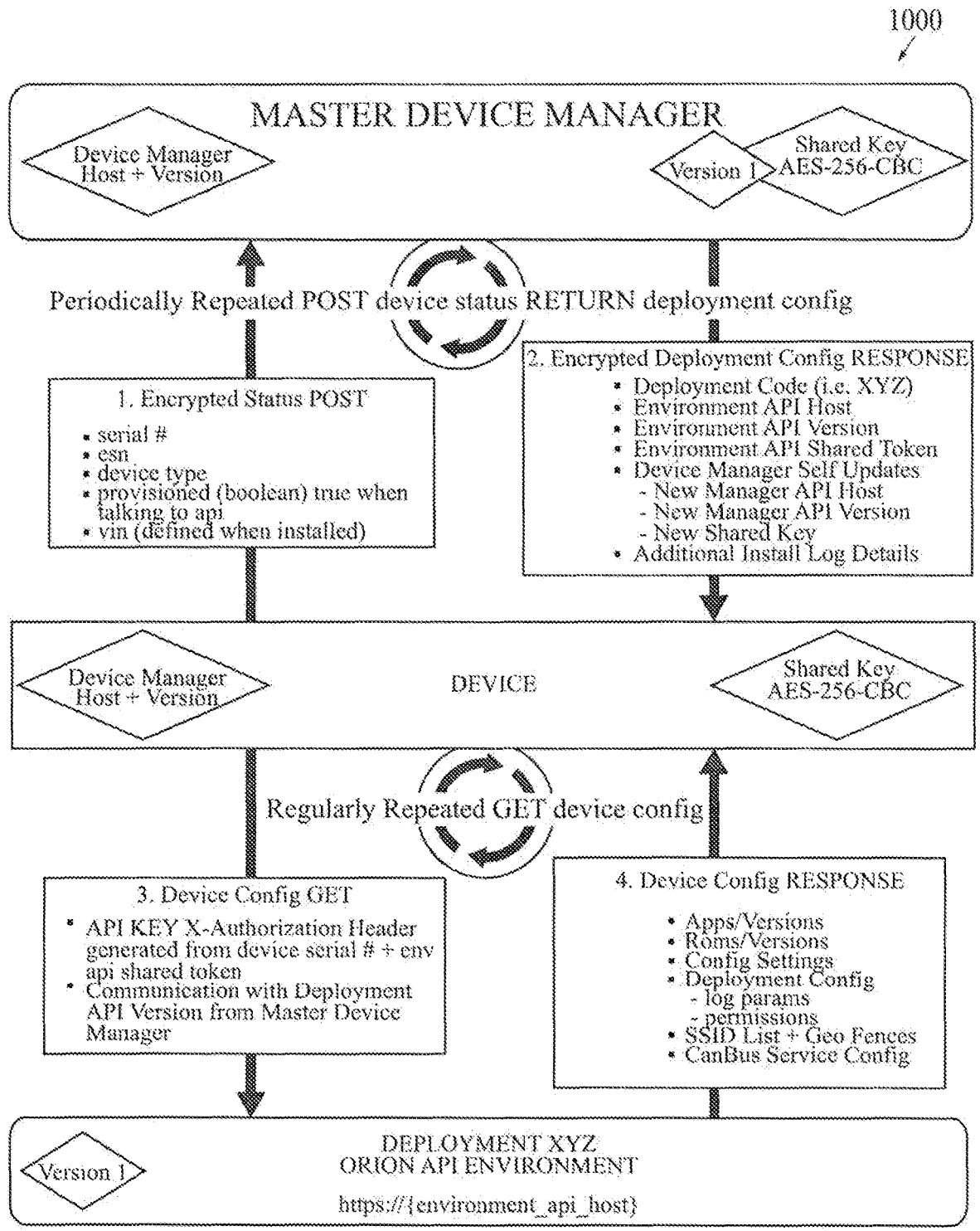
FIG. 10 is a flow diagram.

As shown in FIG. 8, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 130 of the truck 210 in order to connect to the truck based wireless network 224a-224k or 225 of each of the CVDs 130 of each of the trucks 210a-210k. A driver 205 in possession of a tablet computer 110 pairs with the specific truck wireless network 225 of the CVD 130 of the truck 210f, and thus the driver locates the specific truck 210f he is assigned to in a parking lot full of identical looking trucks 210a-210k.

The master device manager and device communication layer is a component of the system. Shared Key AES-256-CBC—shared versioned key between all devices and a device master for versioned device master communication. The device is self-updatable for master device manager communication if encrypted response payload includes updated device manager configuration. The device status post can log which devices are using which manager version and validation of deployment authentication registration. Upon successful communication with device manager, the device will attempt to communicate with given API host. Upon successful API host communication, will report back to device manager as provisioned=true. Upon successful installation, the device should be able to gather a VIN number from an installed truck. Once the VIN exists, the device will send a new status to the device manager with VIN defined and it will record when the device was installed.

Device and deployment API communication layer is a component of the system. Once a device gets deployment host API configuration information from a device master, it will have the URL, API version and token to communicate with the deployment's API. API tokens are unique per deployment host and used along with the device's serial number to create an API authentication key. Once the API authentication key is generated, it is passed along with each API request via the X-Authorization header from the device. On a first communication with the deployment API, the device will download a configuration defined for the device. This will include various pieces of information based on the type of device it is and which version of the apps/roms are involved. For example: Apps/Versions; Roms/Versions; Config Settings; Deployment Config, Log parameters, Permissions; SSID List+Geo Fences; Can Bus Service Config.

One embodiment is a system for vehicle dynamic compliance with multiple vehicle statutes and regulations. The system comprises a truck 210, a CVD 130, a tablet computer 110, a server 140 and a plurality of databases. The vehicle comprises an on-board computer with a memory having a vehicle identification number (VIN), a connector plug, and a motorized engine. The CVD 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. A location of the truck 210 is determined using a GPS component of the truck 210. The location of the truck 210 is transmitted to the server 140 by the CVD. The server 140 retrieves real-time compliance rules for the location of the truck from the plurality of databases, which are preferably State vehicle databases, municipal vehicle databases, county vehicle databases, and Federal vehicle databases. The server 140 transmits the real-time compliance rules to CVD 130 for display on the tablet computer 110 so that a driver of the truck 210 can stay in real-time compliance with State and Federal motor vehicle and driving rules. The rules pertain to speed limits, transport of toxic waste, the transport of refrigerated cargo, the rest durations for drivers, the necessary insurance coverage, the type of taxes and fees to be paid, and the like. The display on the tablet computer is preferably in the form of a visual alert, an audio alert or a haptic alert. Other displays include forms such as attestation forms, and data such as timers, current speed limits, and the like. The trigger for each jurisdiction is preferably from the GPS of the truck 210, the speed of the truck 210, cellular or WiFi triangulation from a network, and the like.

The CVD 130 obtains the vehicle identification number (VIN) from the on-board computer and transmits the VIN with the location to the server 140 for verification of the truck 210.

Another embodiment is a system for utilizing multiple vehicle odometer values. The system comprises a vehicle 210, a CVD 130, a tablet computer 110, a server 140 and a plurality of databases. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. Thus, the truck 210 has a multiple of odometers that can be used to determine a mileage of the truck 210. The connected vehicle device (CVD) 130 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD 130 generates a delta value for odometer value relative to a control odometer value. The CVD 130 monitors the odometer value from each of the odometer component from an engine source, the odometer component from a dashboard source, the odometer component from a chassis source, and the odometer component from a transmission source. The CVD 130 generates a new odometer value for one of the odometer component from an engine source, the odometer component from a dashboard source, the odometer component from a chassis source, and the odometer component from a transmission source, and the CVD modifies the odometer value by the delta value to generate the new odometer value.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for vehicle dynamic compliance with multiple vehicle statutes and regulations, the system comprising:
    a connected vehicle device (CVD) comprising a processor, a radio, a memory, and a connector for connecting to a vehicle;
    and
    a server;
    wherein a location of the vehicle is transmitted to the server by the CVD;
    wherein the server retrieves at least one real-time compliance rule for the location of the vehicle;
    wherein the server transmits the at least one real-time compliance rule to the CVD.

2. The system according to claim 1 further comprising a mobile device for displaying the at least one real-time compliance rule.

3. The system according to claim 1 wherein the vehicle is a delivery truck.

4. The system according to claim 1 wherein the radio of the CVD is a WiFi radio.

5. The system according to claim 1 wherein the CVD obtains a vehicle identification number (VIN) from an on-board computer of the vehicle and transmits the VIN with the location to the server for verification of the vehicle.

6. A method for vehicle dynamic compliance with multiple vehicle statutes and regulations, the method comprising:
    receiving at a server from a connected vehicle device (CVD) a location of a vehicle, the CVD comprising a processor, a radio, a memory, and a connector for connecting to the vehicle;
    retrieving at the server at least one real-time compliance rule for the location of the vehicle from at least one database; and
    transmitting from the server to the CVD the at least one real-time compliance rule for display.

7. The method according to claim 6 further comprising displaying the plurality of real-time compliance rules on a display of a mobile device.

8. The method according to claim 6 wherein the at least one database is at least one of a State vehicle database, a municipal vehicle database, a county vehicle database, or a Federal vehicle database.

9. The method according to claim 6 wherein the vehicle is a delivery truck.

10. The method according to claim 6 wherein the CVD radio is a WiFI radio.

11. The method according to claim 6 wherein the CVD obtains a vehicle identification number (VIN) from an on-board computer and transmits the VIN with the location to the server for verification of the vehicle.

12. A method for vehicle dynamic compliance with multiple vehicle statutes and regulations, the method comprising:
- transmitting to a server from a connected vehicle device (CVD) a location of a vehicle, the CVD comprising a processor, a radio, a memory, and a connector for connecting to the vehicle;
- receiving from the server at the CVD at least one real-time compliance rule for a location of the vehicle, the at least one real-time compliance rule from a a database of rules; and
- displaying the at least one real-time compliance rule.

13. The method according to claim 12 wherein the database of rules comprises at least one of a State vehicle database, a municipal vehicle database, a county vehicle database, or a Federal vehicle database.

14. The method according to claim 12 wherein the vehicle is a delivery truck.

15. The method according to claim 12 wherein the CVD radio is a WiFI radio.

16. The method according to claim 12 wherein the CVD obtains a vehicle identification number (VIN) from an on-board computer and transmits the VIN with the location to the server for verification of the vehicle.

* * * * *